United States Patent
Yoshimi

(10) Patent No.: US 11,410,443 B2
(45) Date of Patent: Aug. 9, 2022

(54) LABELLING TRAINING METHOD AND SYSTEM FOR IMPLEMENTING THE SAME

(71) Applicant: NEC Corporation, Tokyo (JP)

(72) Inventor: Kosuke Yoshimi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 330 days.

(21) Appl. No.: 16/817,617

(22) Filed: Mar. 13, 2020

(65) Prior Publication Data

US 2021/0287058 A1  Sep. 16, 2021

(51) Int. Cl.
- *G06K 9/66* (2006.01)
- *G06V 30/194* (2022.01)
- *G06N 20/00* (2019.01)
- *G06V 30/242* (2022.01)

(52) U.S. Cl.
CPC ........... *G06V 30/194* (2022.01); *G06N 20/00* (2019.01); *G06V 30/242* (2022.01)

(58) Field of Classification Search
CPC .... G06N 20/00; G06V 30/194; G06V 30/242; G06K 9/66; G06K 9/68; G06K 9/6807
See application file for complete search history.

(56) References Cited

U.S. PATENT DOCUMENTS

| | | | | |
|---|---|---|---|---|
| 9,836,850 | B2 * | 12/2017 | Averbuch | G06T 7/0012 |
| 2020/0397346 | A1 * | 12/2020 | Nakajima | G01D 9/00 |

FOREIGN PATENT DOCUMENTS

| | | | |
|---|---|---|---|
| JP | 4651353 | B2 | 3/2011 |
| JP | 2011100175 | A | 5/2011 |
| JP | 5650248 | B2 | 1/2015 |
| JP | 2015-49702 | A | 3/2015 |
| JP | 2016-103246 | A | 6/2016 |
| JP | 5937175 | B2 | 6/2016 |
| JP | WO2014/207991 | A1 | 2/2017 |
| JP | 6400304 | B2 | 10/2018 |
| JP | 2018190132 | A | 11/2018 |
| JP | 6607243 | B2 | 11/2019 |
| WO | 2019/176991 | A1 | 9/2019 |

OTHER PUBLICATIONS

International Search Report in PCT Application No. PCT/JP2021/009747, dated May 18, 2021, 3pp.

* cited by examiner

*Primary Examiner* — Tuan H Nguyen
(74) *Attorney, Agent, or Firm* — Hauptman Ham, LLP

(57) ABSTRACT

A method of training a model includes generating processed data by analyzing an input related to an image using a pre-trained model to detect an object in the input. The method includes generating moving area detection data by analyzing the input to determine whether any areas within the input exhibit movement. The method includes generating temporal inconsistency data by analyzing the processed data to determine whether any areas within the processed data exhibit a temporal inconsistency. The method includes identifying whether the input contains an error candidate based on the moving area detection data and the temporal inconsistency data. The method includes receiving confirmation information regarding whether the error candidate is an undetected object within the input. The method includes updating the pre-trained model in response to receiving the confirmation information indicating that the error candidate is the undetected object within the input.

20 Claims, 10 Drawing Sheets

US 11,410,443 B2

LABELLING TRAINING METHOD AND SYSTEM FOR IMPLEMENTING THE SAME

BACKGROUND

Learning models are used to analyze images to identify objects within the image. The learning models tag or highlight identified objects within the image and output the image including the identified objects to a user. The user is able to use the image including identified objects to monitor objects, including people, within the image.

The models are updated by identifying errors in the analyzed image. Updating the models helps to improve the accuracy and precision of the identification of objects within the image. The errors are identified by a user and the identified errors are fed back into the model. In some instances, the user looks through all images containing identified objects to determine whether any error, such as a false negative or a false positive, exist within the image containing identified objects. A false positive is where the model identified an object where no object exists. A false negative is where the model fails to identify an object where an object does exist. Based on errors identified by the user, the model learns to identify similar objects for future image analysis that were erroneously omitted in previous iterations of the model.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
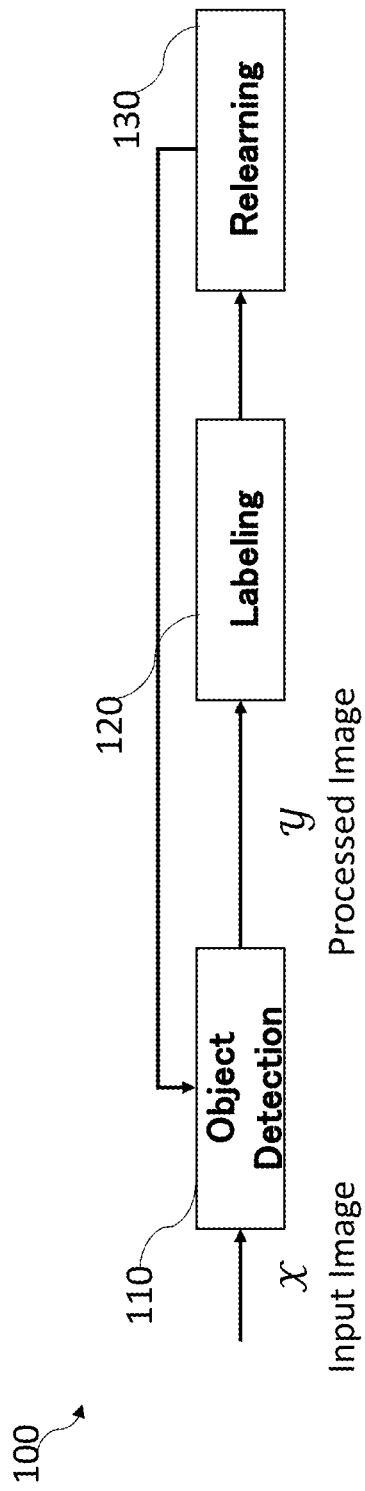
FIG. 1 is a flow chart of a method of analyzing an image in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, arrangements, or the like, are contemplated. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Object detection systems receive input images, for example, from a surveillance camera, analyze the input image to detect objects and then output the results. In some instances, the results are output to a user. The results identify the detected objects and permit tracking of a detected object to determine movement of the detected object, such as a person or vehicle, or changes in status of the detected object, such as a stationary sign. Accurately and precisely identifying objects helps to improve security for a monitored area, traffic prediction for traveling in a monitored area, or the like.

Improving accuracy and precision for object identification is based on identifying errors in object identification, correcting the errors and feeding back the corrected errors to a training model. The training model is able to use the error feedback to update the model to reduce or eliminate such errors in future analysis.

Error detection is performed by a user, in some instances. The user reviews images analyzed using the training model, then the user identifies errors in the analysis performed by the training model. This is a time-consuming process and analysis of images which have no errors do not assist with the improvement to the model. By analyzing the images processed by the model to identify images that have a high likelihood of containing an error, the model is improved faster in comparison with other approaches. Avoiding the review of all images also reduces a workload on the user.

In the current disclosure, embodiments are described for identifying candidate images for review by a user in order to reduce a workload for the user and to more quickly improve a model used to analyze received images. In some embodiments, the candidate images are selected based on a likelihood of the image containing a false negative. That is, the model failed to accurately identify an object within the received image during the analysis. When a processed image is determined to have a high likelihood of containing a false negative the processed image in identified as a candidate image, which is provided to the user to help improve the model. In contrast, if the processed image is determined to have a low likelihood of containing a false negative, the processed image is not provided to the user in order to reduce the workload of the user and to permit the user to focus on evaluating processed images that are more likely to help improve the model.

FIG. 1 is a flow chart of a method 100 of analyzing an image in accordance with some embodiments. Method 100 includes operation 110 in which an object is detected. An input image $\mathcal{X}$ is received in operation 110. In some embodiments, the input image $\mathcal{X}$ is received from an image detector, such as a surveillance camera, a traffic camera, a smartphone, or another suitable image detector. In operation 110, the input image $\mathcal{X}$ is analyzed using a pre-trained model. In some embodiments, the pre-trained model is generated based on sample data. In some embodiments, the pre-trained model is generated based on empirical data. In some embodiments, the pre-trained model is generated based on both sample data and empirical data.

The current description refers to input image $\mathcal{X}$ and processed image $\mathcal{Y}$ as well as other parameters including the term "image" in the name of the parameter. The term "image" is used in the name for the sake of clarity to assist one of ordinary skill in the art in understanding relationships of the various parameters within this description. One of ordinary skill in the art would recognize that the information contained within the parameter is a data string, in some embodiments. For example, in some embodiments, an image is not transmitted between different devices within this description. Instead, data strings indicating a position of an object are used in some embodiments. In some embodiments, the data string includes a sequence of numbers or another suitable data string.

In operation 110, the pre-trained model is applied to the input image $\mathcal{X}$ and objects are identified. A processed image $\mathcal{Y}$ is output from operation 110. The processed image $\mathcal{Y}$ includes the input image $\mathcal{X}$ with identification of detected objects. As noted above, in some embodiments, the input image $\mathcal{X}$ is received as an image. In some embodiments, the input image $\mathcal{X}$ is received as a data string. In some embodiments, the processed image $\mathcal{Y}$ is received as a modified image. In some embodiments, the processed image $\mathcal{Y}$ is received as a modified data string.

In operation 120, the processed image $\mathcal{Y}$ is labeled. In some embodiments, the detected objects are labeled using an outline surrounding the object; shading of the object; a tag line connected to the object; information superimposed on the image proximate to the object or another suitable form of identification. For simplicity, the current disclosure uses an outline surrounding the object to denote labeling of an identified object. The use of an outline is not intended to limit the scope of this disclosure.

In operation 130, the labeled image is analyzed to perform a relearning process. The relearning process includes identifications of errors in the labeled image. In some embodiments, the identified errors include at least one of false positives or false negatives. Erroneous labels (or lack of labels) are corrected by a user. The corrected information is fed back into the object detection in operation 110 in order to improve the model used for identifying objects in the input image $\mathcal{X}$. In some embodiments, the labeled image is transmitted as an image. In some embodiments, the labeled image is transmitted as a data string.

Figure 2:
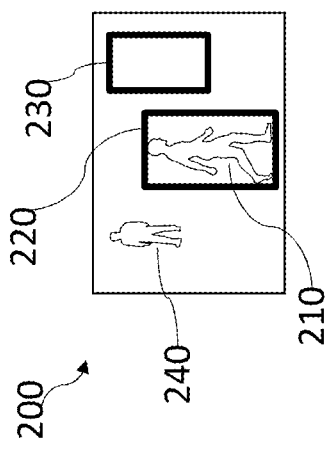
FIG. 2 is a view of a labeled image in accordance with some embodiments.

FIG. 2 is a view of a labeled image 200 in accordance with some embodiments. In some embodiments, the labeled image 200 is an image generated based on a data string. Labeled image 200 includes a detected object 210. The detected object 210 is labeled during outline 220. The outline 220 surrounds the detected object 210. The outline 220 is rectangular. In some embodiments, a shape of the outline 220 is not rectangular, for example, circular, oval, polygonal, free form, or another suitable shape. In some embodiments, as mentioned above, the outline 220 is replaced with a different type of labeling.

Labeled image 200 further includes an outline 230. The outline 230 surrounds an empty space in the labeled image 200. The outline 230 indicates a false positive. That is, the model erroneously identified an object as existing at the location surrounded by the outline 230. In some embodiments, the error of the false positive for the outline 230 will be identified as part of a relearning operation, e.g., operation 130 of method 100 (FIG. 1).

Labeled image 200 further includes an undetected objection 240. The undetected object is not surrounded by an outline because the model failed to detect the undetected object 240. The undetected object 240 is a false negative. That is, the model failed to detect the undetected object 240 despite the object actually existing in the labeled image 200. In some embodiments, the error of the false negative for the undetected objection 240 will be identified as part of a relearning operation, e.g., operation 130 of method 100 (FIG. 1).

Figure 3:
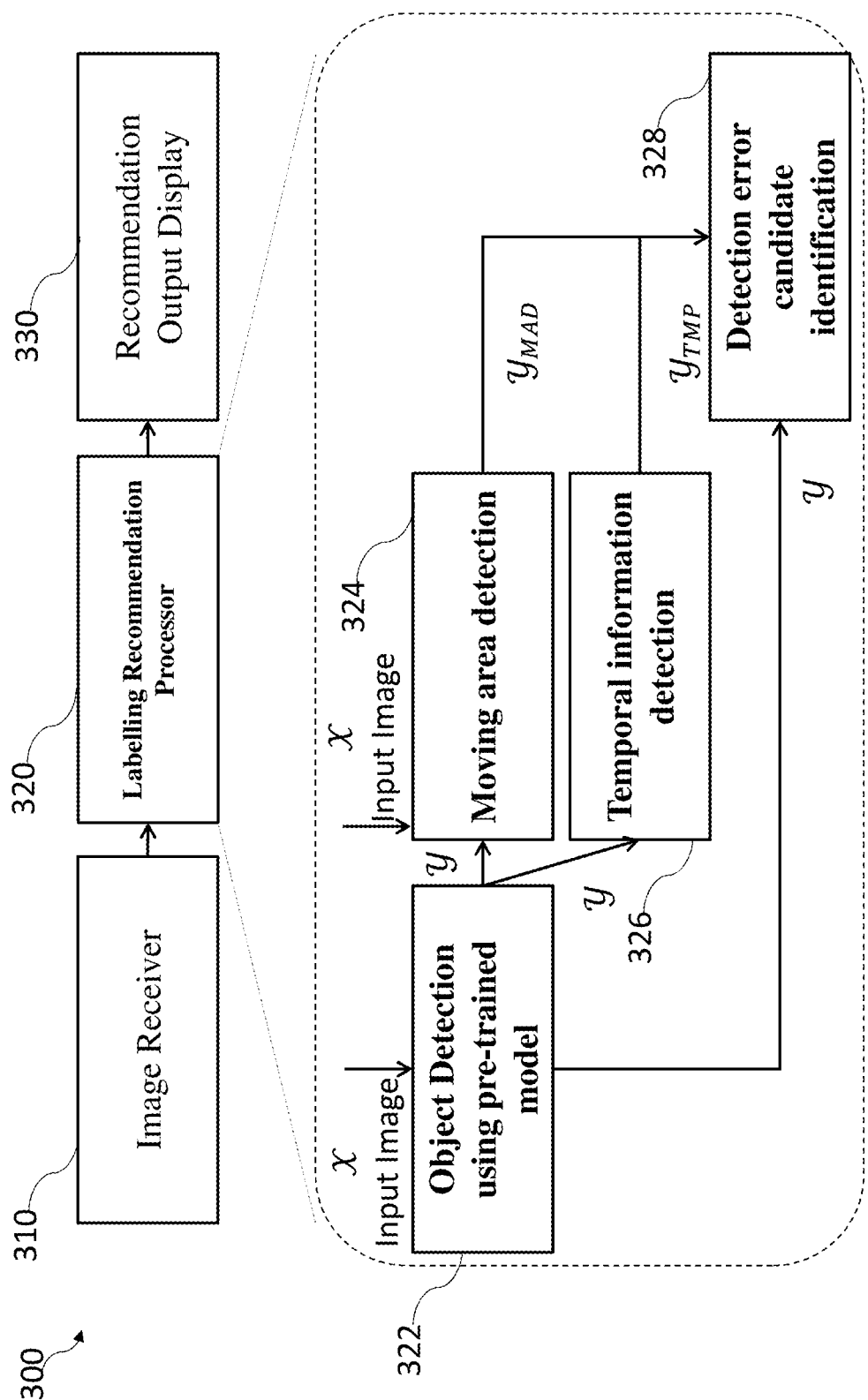
FIG. 3 is a block diagram of a system for identifying error candidates in accordance with some embodiments.

FIG. 3 is a block diagram of a system 300 for identifying error candidates in accordance with some embodiments. System 300 includes an image receiver 310 configured to receive an input image. In some embodiments, the image receiver 310 includes a processor. In some embodiments, the image receiver 310 is also configured to capture the input image. In some embodiments, the image receiver 310 includes a camera or image detector. In some embodiments, the image receiver 310 includes a processor as well as a camera or image detector.

The input image received or captured by the image receiver 310 is transferred to a labelling recommendation processor 320. The labelling recommendation processor 320 is configured to determine whether the input image is an error candidate. An error candidate is an image that has a high likelihood of containing an error. By identifying error candidates, a workload of a user for improving a model used for analyzing an image is reduced in comparison with other approaches. The labelling recommendation processor 320 includes a processor. In some embodiments, the labelling recommendation processor 320 is integrated with the image receiver 310. In some embodiments, the labelling recommendation processor 320 is separate from the image receiver 310. In some embodiments, the input image is transferred to the labelling recommendation processor 320 wirelessly. In some embodiments, the input image is transferred to the labelling recommendation processor 320 using a wired connection.

Figure 13:
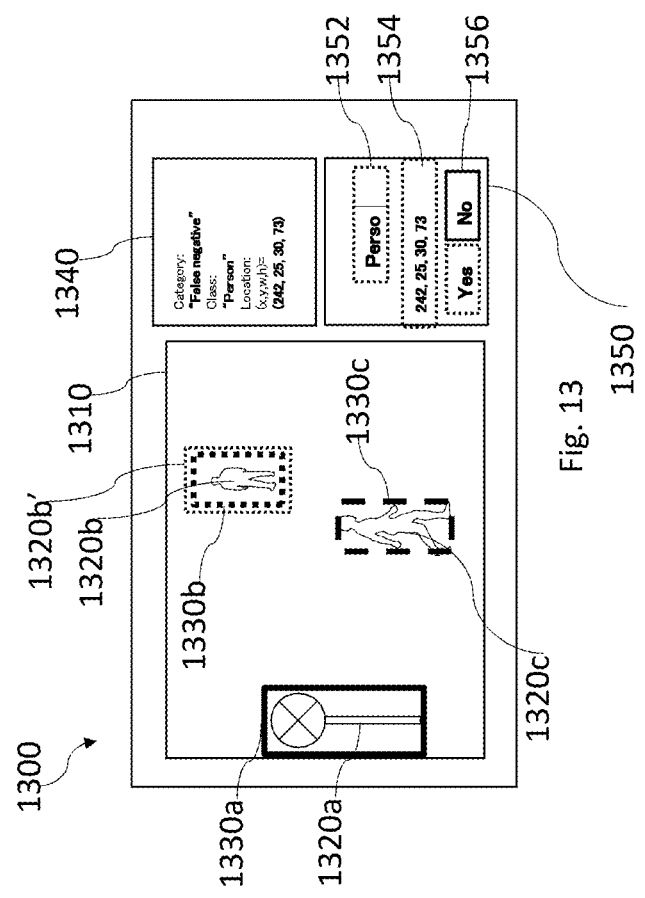
FIG. 13 is a view of a user interface including an image including identified objects and identified candidate objects in accordance with some embodiments.

Error candidates identified by the labelling recommendation processor 320 are transferred to the recommendation output display 330. The recommendation output display 330 is configured to display the error candidates to the user and to receive input from the user regarding whether the error candidates actually contain any errors, such as false negatives or false positives. The recommendation output display 330 includes a display and an interface for receiving input from the user. In some embodiments, the recommendation output display 330 includes a touch screen. In some embodiments, the recommendation output display 330 includes a keyboard, a mouse or another suitable interface for receiving user input. In some embodiments, a user interface of the recommendation output display 330 is similar to user interface 1200 (FIG. 12) or user interface 1300 (FIG. 13).

Labelling recommendation processor 320 is configured to implement operation 322 for performing object detection using a pre-trained model. The input image $\mathcal{X}$ $\mathcal{X}$ is received from the image receiver 310 and the pre-trained model is used to detect objects within the input image $\mathcal{X}$. The processed image $\mathcal{Y}$ is generated based on the objects detected using the pre-trained model. In some embodiments, the pre-trained model is generated based on sample data. In some embodiments, the pre-trained model is generated based on empirical data. In some embodiments, the pre-trained model is generated based on both sample data and empirical data. In some embodiments, the pre-trained model has undergone at least one update based on prior image analysis using system 300.

Labelling recommendation processor 320 is configured to implement operation 324 for detecting a moving area. The input image $\mathcal{X}$ and the processed image $\mathcal{Y}$ are used to determine whether the input image $\mathcal{X}$ contains any areas where an object is moving. In order to determine whether the input image $\mathcal{X}$ includes a moving area the labelling recommendation processor 320 relies on search windows. As noted above, in some embodiments, the input image $\mathcal{X}$ is received as an image. In some embodiments, the input image $\mathcal{X}$ is received as a data string. In some embodiments, the processed image $\mathcal{Y}$ is received as a modified image. In some embodiments, the processed image $\mathcal{Y}$ is received as a modified data string.

Figure 4:
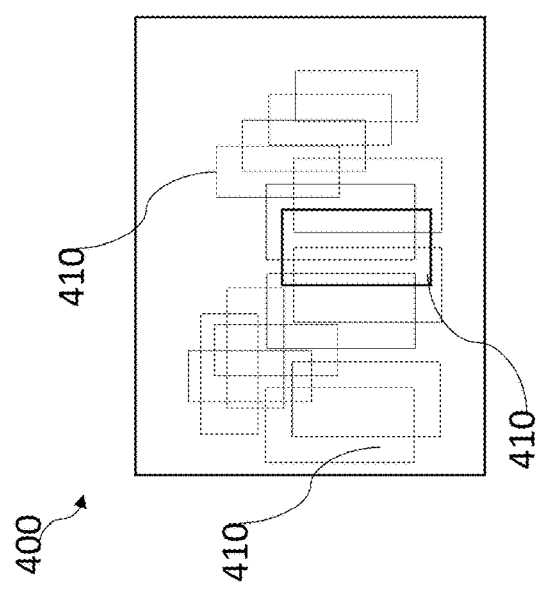
FIG. 4 is a view of an image including a plurality of search windows in accordance with some embodiments.

FIG. 4 is a view of an image 400 including a plurality of search windows 410 in accordance with some embodiments. The search windows 410 are discrete areas of the image 400 which are analyzed in order to manage the analysis of the image 400. The search windows 410 are not visible in the image 400. Instead, the search windows 410 are used by a processor, such as labelling recommendation processor 320, to determine the location and bounds for analysis for determining whether the image 400 contains moving areas. All of the search windows 410 in image 400 have a rectangular shape. In some embodiments, at least one search window 410 has a different shape. In some embodiments, a shape of at least one of the search windows 410 is circular, oval, polygonal, free-form or another suitable shape. The search windows 410 in image 400 have different sizes. In some embodiments, all of the search windows 410 have a same size. In some embodiments, a size and position of each of the search windows 410 is predetermined, for example by a user. In some embodiments, a size or a position of each of the search windows 410 is determined by the processor performs an analysis using the search windows 410. A size and location of the search windows 410 is determined based on a size of the input image $\mathcal{X}$ and a number of detected objects within the input image $\mathcal{X}$, in some embodiments.

The processor analyzes pixels within the search windows 410 for consecutive input images $\mathcal{X}$ to determine whether a change in the pixels indicates movement within an area of the corresponding search window 410. In some embodiments, the change in the pixel is related to brightness, color, contrast, or another suitable parameter. For example, where a pixel within a search window 410 changes from a low brightness to a high brightness in consecutive input images $\mathcal{X}$ the processor will detect a moving area within the search window 410, in some embodiments.

Figure 5:
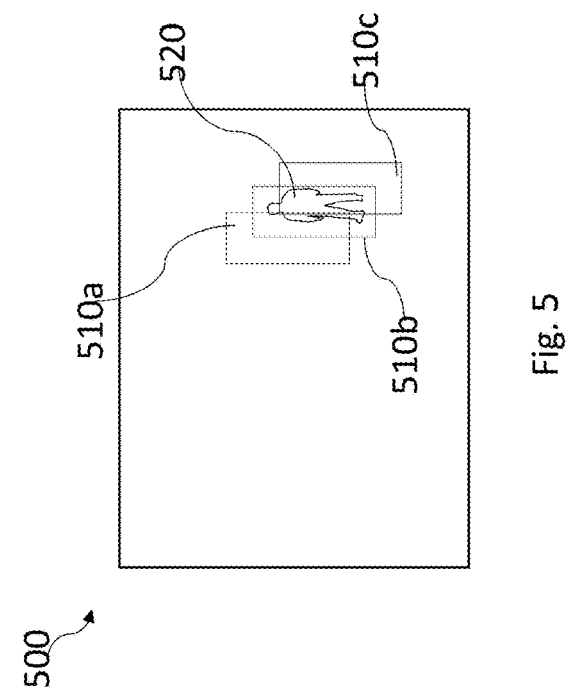
FIG. 5 is a view of an image including a plurality of search windows and an object in accordance with some embodiments.

FIG. 5 is a view of an image 500 including a plurality of search windows 510a-510c and an object 520 in accordance with some embodiments. During analysis of the input image $\mathcal{X}$ some moving areas are in locations that overlap with multiple search windows. For example, in a situation where object 520 is determined to be a moving area within image 500, object 520 overlaps with search windows 510a, 510b and 510c. In some embodiments, the processor uses non max suppression in order to determine which of the search windows 510a-510c to use for determining the location of the object 520 in image 500. Non max suppression determines which of the search windows 510a-510c includes the most overlap with object 520 and uses that search window for analysis of the input image $\mathcal{X}$. In image 500, the search window 510b has the most overlap with object 520. Therefore, the processor will analyze object 520 using search window 510b in image 500.

Returning operation 324, by receiving both the input image $\mathcal{X}$ and the processed image $\mathcal{Y}$ the labelling recommendation processor 320 is able to reduce an amount of computation for analyzing the input image $\mathcal{X}$. The labelling recommendation processor 320 is able to exclude search windows, e.g., search windows 410, at locations where an object was already detected during operation 322. This reduces the locations within input image $\mathcal{X}$ to be analyzed by the labelling recommendation processor 320 and increases the speed of the analysis of input image $\mathcal{X}$. The operation 324 outputs a moving area detection image $\mathcal{Y}_{MAD}$ which includes the processed image $\mathcal{Y}$ modified to further identify moving areas within the processed image $\mathcal{Y}$. In some embodiments, operation 324 receives an inverse processed image $\overline{\mathcal{Y}}$. An inverse processed image $\overline{\mathcal{Y}}$ is an inverse of the processed image $\mathcal{Y}$. That is, the inverse processed image $\overline{\mathcal{Y}}$ omits search windows that overlap with objects detected by the model. Using the inverse processed image $\overline{\mathcal{Y}}$ helps to reduce computation workload similar to the use of the processed image $\mathcal{Y}$. In some embodiments, the moving area detection image $\mathcal{Y}_{MAD}$ is received as a modified image. In some embodiments, the moving area detection image $\mathcal{Y}_{MAD}$ is received as a modified data string. In some embodiments, the inverse processed image $\overline{\mathcal{Y}}$ is received as a modified image. In some embodiments, the inverse processed image $\overline{\mathcal{Y}}$ is received as a modified data string.

The labelling recommendation processor 320 is configured to perform operation 326 in which temporal information detection is performed using processed image $\mathcal{Y}$. Temporal information detection relates to loss of consistency or integrity within a series of processed images $\mathcal{Y}$. In some embodiments, temporal information detection is performed using search windows, e.g., search windows 410 (FIG. 4). The labelling recommendation processor 320 analyzes processed images $\mathcal{Y}$ to determine whether any portions of the processed images $\mathcal{Y}$ are unable to be analyzed by the pre-trained model. For example, if a portion the processed image $\mathcal{Y}$ contains a significant amount of noise or if a light level of the processed image $\mathcal{Y}$ is low, the pre-trained model will be unable to detect objects within that portion of the processed image $\mathcal{Y}$.

Temporal information detection helps with maintaining temporal consistency with in the analysis performed by the labelling recommendation processor 320. For example, if an object is detected at a specific location in a first processed image $\mathcal{Y}$ at a first time, the same object would be expected to be detected at a similar location in a second processed image $\mathcal{Y}$ at a second time immediately following the first time. If noise or light level prevents accurate detection of the expected object, temporal information detection will identify the processed image $\mathcal{Y}$ as likely containing an error which is usable to enhance the model for analyzing future images.

In system 300, the temporal information detection is performed by the labelling recommendation processor 320 based only on the processed image $\mathcal{Y}$. In some embodiments, the temporal information detection is performed based on a combination of the processed image $\mathcal{Y}$ and the input image $\mathcal{X}$. In some embodiments, the temporal information detection is performed based only on the input image $\mathcal{X}$.

In some embodiments, the labelling recommendation processor 320 uses the processed image $\mathcal{Y}$ to reduce an amount of computation. In some embodiments, the labelling recommendation processor 320 excludes search windows, e.g., search windows 410, at locations where an object was already detected during operation 322. This reduces the locations within processed image $\mathcal{Y}$ to be analyzed by the labelling recommendation processor 320 and increases the speed of the analysis of processed image $\mathcal{Y}$. The operation 326 outputs a temporal information detection image $\mathcal{Y}_{TMP}$ which includes the processed image $\mathcal{Y}$ modified to further identify areas within the processed image $\mathcal{Y}$ which have temporal inconsistency or areas where object detection is difficult for the model. In some embodiments, operation 326 is performed using the inverse processed image $\overline{\mathcal{Y}}$. In some embodiments, the temporal information detection image $\mathcal{Y}_{TMP}$ is received as a modified image. In some embodiments, the temporal information detection image $\mathcal{Y}_{TMP}$ is received as a modified data string.

The labelling recommendation processor 320 is configured to perform operation 328, in which detection error candidates are identified. Detection error candidates are identified based on a comparison of the processed image $\mathcal{Y}$, the moving area detection image $\mathcal{Y}_{MAD}$, and the temporal information detection image $\mathcal{Y}_{TMP}$. The labelling recommendation processor 320 identifies an input image $\mathcal{X}$ as an error detection candidate if either the moving area detection image $\mathcal{Y}_{MAD}$, or the temporal information detection image $\mathcal{Y}_{TMP}$ includes a potential object, e.g., a moving area or an area of temporal inconsistency, which was not detected in the processed image $\mathcal{Y}$. The labelling recommendation processor 320 does not identify an input image $\mathcal{X}$ as an error detection candidate if the moving area detection image $\mathcal{Y}_{MAD}$, and the temporal information detection image $\mathcal{Y}_{TMP}$ match the processed image $\mathcal{Y}$, i.e., no additional potential objects are detected. The moving area detection image $\mathcal{Y}_{MAD}$ and the temporal information detection image $\mathcal{Y}_{TMP}$ do not specifically identify that an object is actually within the input image $\mathcal{X}$. Instead, the moving area detection image $\mathcal{Y}_{MAD}$ and the temporal information detection image $\mathcal{Y}_{TMP}$ identify locations of possible objects. The labelling recommendation processor 320 outputs error detection candidates based on the possibility of undetected objects to the recommendation output display 330 in order to allow the user to make a final determination of whether an object actually exists at the locations identified by the moving area detection image $\mathcal{Y}_{MAD}$ and the temporal information detection image $\mathcal{Y}_{TMP}$.

By providing only the error detection candidates to the user, system 300 reduces a workload of the user by providing the user only with images that have an increased likelihood of containing an error for review. This helps to more rapidly improve the model for analyzing input images $\mathcal{X}$ because a higher amount of feedback identifying errors in the model is provided in a shorter period of time in comparison with other approaches. The reduced workload on the user and the higher concentration of errors in the images reviewed by the user will also help to reduce the odds of the user overlooking an error during the review of images. In some instances, when a user has reviewed numerous consecutive images with no errors the user becomes complacent and may not review images with a same level of precision. As a result, an error in a subsequently reviewed image is more likely to be overlooked by the user, which fails to provide improvement feedback to the model. This complacency is reduced or avoided when the percentage of reviewed images containing errors is high. Therefore, the system 300 is able to improve the model faster through the use of error detection candidates in comparison with other approaches.

Figure 6:
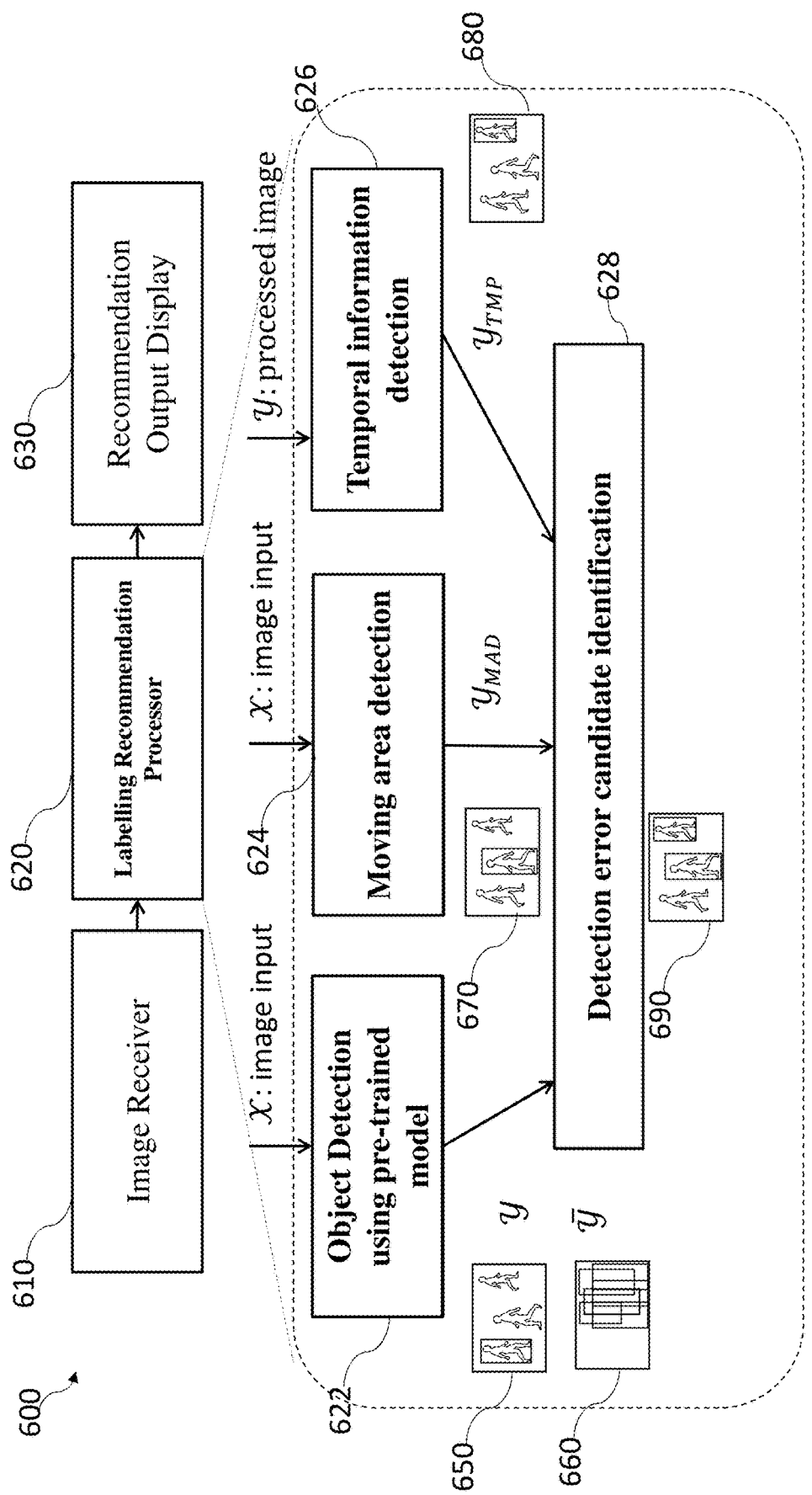
FIG. 6 is a block diagram of a system for identifying error candidates in accordance with some embodiments.

FIG. 6 is a block diagram of a system 600 for identifying error candidates in accordance with some embodiments. System 600 includes an image receiver 610 configured to receive an input image. Image receiver 610 is similar to image receiver 310 (FIG. 3) and a detailed description of image receiver 610 is omitted for the sake of brevity.

The input image received or captured by the image receiver 610 is transferred to a labelling recommendation processor 620. The labelling recommendation processor 620 is configured to determine whether the input image is an error candidate. An error candidate is an image that has a high likelihood of containing an error. By identifying error candidates, a workload of a user for improving a model used for analyzing an image is reduced in comparison with other approaches. The labelling recommendation processor 620 includes a processor. In some embodiments, the labelling recommendation processor 620 is integrated with the image receiver 610. In some embodiments, the labelling recommendation processor 620 is separate from the image receiver 610. In some embodiments, the input image is transferred to the labelling recommendation processor 620 wirelessly. In some embodiments, the input image is transferred to the labelling recommendation processor 620 using a wired connection.

Error candidates identified by the labelling recommendation processor 620 are transferred to the recommendation output display 630. Recommendation output display 630 is similar to recommendation output display 330 (FIG. 3) and a detailed description of recommendation output display 630 is omitted for the sake of brevity.

Labelling recommendation processor 620 is configured to implement operation 622 for performing object detection using a pre-trained model. Operation 622 is similar to operation 322 (FIG. 3) and a detailed description of operation 622 is omitted for the sake of brevity. Operation 622 outputs either the processed image $\mathcal{Y}$ or the inverse processed image $\overline{\mathcal{Y}}$ to be used in operation 628. Image 650 is an example of the processed image $\mathcal{Y}$. In image 650 all of the objects are shown a person icons. In some embodiments, the objects include objects other than people. In image 650 only the object on the left side of the image 650 is identified as a detected object. The other objects in image 650 were not detected in operation 622. Image 660 is an example of the inverse processed image $\overline{\mathcal{Y}}$. Image 660 includes a plurality of search windows in portions of the image 660 corresponding to the non-detected objects in image 650.

Labelling recommendation processor 620 is configured to implement operation 624 for detecting a moving area. In contrast to operation 324, operation 624 does not receive the processed image $\mathcal{Y}$. In system 600, operation 624 is performed using only the input image $\mathcal{X}$ to determine whether the input image $\mathcal{X}$ contains any areas where an object is moving. In order to determine whether the input image $\mathcal{X}$ includes a moving area the labelling recommendation processor 620 relies on search windows, which are discussed in detail above. The operation 624 outputs a moving area detection image $\mathcal{Y}_{MAD}$ which includes identified moving areas. Image 670 is an example of the moving area detection image $\mathcal{Y}_{MAD}$. In image 670 the center object was detected as a moving area during operation 624. Therefore, the center object is identified in the moving area detection image $\mathcal{Y}_{MAD}$. The objects on the left side and on the right side of image 670 were not detected as including moving areas. Therefore, the left and right objects were not identified in the moving area detection image $\mathcal{Y}_{MAD}$.

The labelling recommendation processor 620 is configured to perform operation 626 in which temporal information detection is performed using the processed image $\mathcal{Y}$. Operation 626 is similar to operation 326 (FIG. 3) and a detailed description of operation 626 is omitted for the sake of brevity. Image 680 is an example of the temporal information detection image $\mathcal{Y}_{TMP}$. In image 680 the right side object was detected as having information inconsistency during operation 626. Therefore, the right side object is identified in the temporal information detection image $\mathcal{Y}_{TMP}$. The objects on the left side and in the center of image 680 had information consistency. Therefore, the left and center objects were not identified in the temporal information detection image $\mathcal{Y}_{TMP}$.

The labelling recommendation processor 620 is configured to perform operation 628, in which detection error candidates are identified. Detection error candidates are identified based on a comparison of the processed image $\mathcal{Y}$, the moving area detection image $\mathcal{Y}_{MAD}$, and the temporal information detection image $\mathcal{Y}_{TMP}$. The labelling recommendation processor 620 identifies an input image $\mathcal{X}$ as an error detection candidate if either the moving area detection image $\mathcal{Y}_{MAD}$, or the temporal information detection image $\mathcal{Y}_{TMP}$ includes a potential object, e.g., a moving area or an area of temporal inconsistency, which was not detected in the processed image $\mathcal{Y}$. The labelling recommendation processor 620 does not identify an input image $\mathcal{X}$ as an error detection candidate if the moving area detection image $\mathcal{Y}_{MAD}$, and the temporal information detection image $\mathcal{Y}_{TMP}$ match the processed image $\mathcal{Y}$, i.e., no additional potential objects are detected. The moving area detection image $\mathcal{Y}_{MAD}$ and the temporal information detection image $\mathcal{Y}_{TMP}$ do not specifically identify that an object is actually within the input image $\mathcal{X}$. Instead, the moving area detection image $\mathcal{Y}_{MAD}$ and the temporal information detection image $\mathcal{Y}_{TMP}$ identify locations of possible objects. The labelling recommendation processor 620 outputs error detection candidates based on the possibility of undetected objects to the recommendation output display 330 in order to allow the user to make a final determination of whether an object actually exists at the locations identified by the moving area detection image $\mathcal{Y}_{MAD}$ and the temporal information detection image $\mathcal{Y}_{TMP}$. Image 690 is an example of an image including error candidates. In image 690 the center object and the right side object were identified as potential errors based on a comparison with t the processed image $\mathcal{Y}$ or the inverse processed image $\bar{\mathcal{Y}}$ during operation 628. Therefore, the center object and the right side object are identified in image 690 as error candidates. The object on the left side was identified in the processed image $\mathcal{Y}$ or the inverse processed image $\bar{\mathcal{Y}}$. Therefore, the left object was not identified in image 690.

By providing only the error detection candidates to the user, system 600 reduces a workload of the user by providing the user only with images that have an increased likelihood of containing an error for review. This helps to more rapidly improve the model for analyzing input images $\mathcal{X}$ because a higher amount of feedback identifying errors in the model is provided in a shorter period of time in comparison with other approaches. The reduced workload on the user and the higher concentration of errors in the images reviewed by the user will also help to reduce the odds of the user overlooking an error during the review of images. In some instances, when a user has reviewed numerous consecutive images with no errors the user becomes complacent and may not review images with a same level of precision. As a result, an error in a subsequently reviewed image is more likely to be overlooked by the user, which fails to provide improvement feedback to the model. This complacency is reduced or avoided when the percentage of reviewed images containing errors is high. Therefore, the system 600 is able to improve the model faster through the use of error detection candidates in comparison with other approaches.

Figure 7:
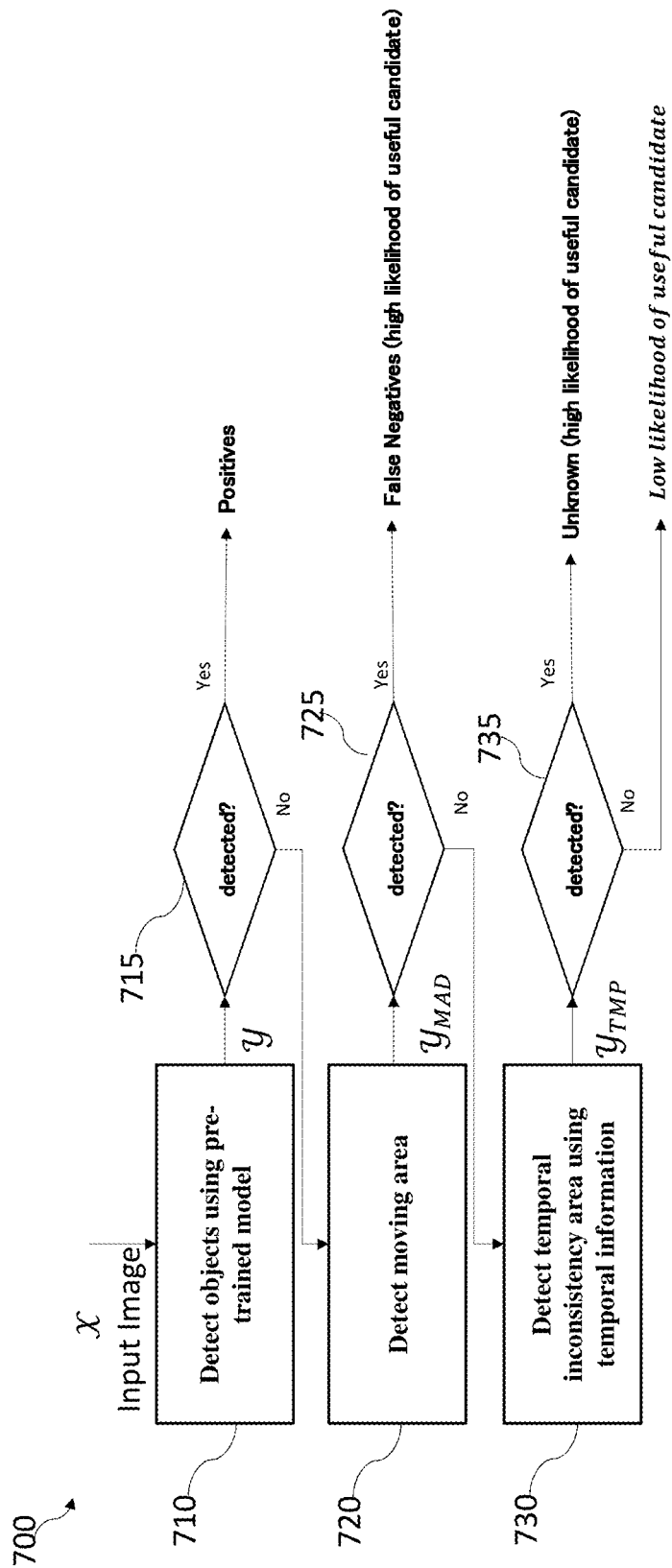
FIG. 7 is a flow chart of a method of identifying error candidates in accordance with some embodiments.

FIG. 7 is a flow chart of a method 700 of identifying error candidates in accordance with some embodiments. Method 700 receives an input image $\mathcal{X}$. In operation 710, the input image $\mathcal{X}$ is analyzed using a pre-trained model to detect objects within the input image $\mathcal{X}$. The processed image $\mathcal{Y}$ is generated based on the objects detected using the pre-trained model. In some embodiments, the pre-trained model is generated based on sample data. In some embodiments, the pre-trained model is generated based on empirical data. In some embodiments, the pre-trained model is generated based on both sample data and empirical data. In some embodiments, the pre-trained model has undergone at least one update based on prior image analysis using system 300.

In operation 715, a determination is made regarding whether any objects were detected during operation 710. Any objects that were detected in operation 710 are determined to be positives, e.g., true positives, as indicated by "yes" from operation 715. Objects identified as positives are not error candidates. Any portions of the processed image $\mathcal{Y}$ that do not include detected objects proceed along the "no" option from operation 715 to operation 720.

In operation 720, the processed image $\mathcal{Y}$ is used to determine whether the input image $\mathcal{X}$ contains any areas where an object is moving. Search windows are used to determine whether the processed image $\mathcal{Y}$. Details of search windows are discussed above with respect to FIGS. 4 and 5.

Relying on the processed image $\mathcal{Y}$ reduces an amount of computation for attempting to identify moving areas by focusing the analysis on only portions of the processed image $\mathcal{Y}$ which do not include detected objects. Operation 720 excludes search windows, e.g., search windows 410, at locations where an object was already detected during operation 710. The operation 720 outputs a moving area detection image $\mathcal{Y}_{MAD}$. In some embodiments, operation 720 uses the inverse processed image $\bar{\mathcal{Y}}$.

In operation 725, a determination is made regarding whether any moving areas were identified during operation 720. Any moving areas that were detected in operation 720 are determined to be potential false negatives and are identified as error candidates as indicated by "yes" from operation 725. Any portions of the moving area detection image $\mathcal{Y}_{MAD}$ that do not include moving areas proceed along the "no" option from operation 725 to operation 730.

In operation 730, temporal information detection is performed using the moving area detection image $\mathcal{Y}_{MAD}$. Temporal information detection relates to loss of consistency or integrity within a series of processed images $\mathcal{Y}$. In some embodiments, temporal information detection is performed using search windows, e.g., search windows 410 (FIG. 4). The moving area detection image $\mathcal{Y}_{MAD}$ is analyzed to determine whether any portions of the moving area detection image $\mathcal{Y}_{MAD}$ are unable to be analyzed by the pre-trained model. For example, if a portion the moving area detection image $\mathcal{Y}_{MAD}$ contains a significant amount of noise or if a light level of the moving area detection image $\mathcal{Y}_{MAD}$ is low, the pre-trained model will be unable to detect objects or moving areas within that portion of the moving area detection image $\mathcal{Y}_{MAD}$.

Temporal information detection helps with maintaining temporal consistency. For example, if an object is detected at a specific location in a first moving area detection image $\mathcal{Y}_{MAD}$ at a first time, the same object would be expected to be detected at a similar location in a second moving area detection image $\mathcal{Y}_{MAD}$ at a second time immediately following the first time. If noise or light level prevents accurate detection of the expected object, temporal information detection will identify the moving area detection image $\mathcal{Y}_{MAD}$ as likely containing an error which is usable to enhance the model for analyzing future images.

In operation 735, a determination is made regarding whether any temporal inconsistencies were identified during operation 730. Any temporal inconsistencies that were detected in operation 730 are determined to be potential false negatives and are identified as error candidates as indicated by "yes" from operation 735. Any portions of the temporal information detection image $\mathcal{Y}_{TMP}$ that do not include moving areas or temporal inconsistencies proceed along the "no" option from operation 735 and are determined to not be error candidates because of the low likelihood of an error in the initial detection by the pre-trained model.

Error candidates identified at either operation 725 or operation 735 are reported to the user for review. By providing error candidates to the user only when there is a high likelihood of error in the initial detection by the pre-trained model, method 700 reduces a workload of the user by providing the user only with images that have an increased likelihood of containing an error for review. The advantages for this reduced workload are discussed above.

Figure 8:
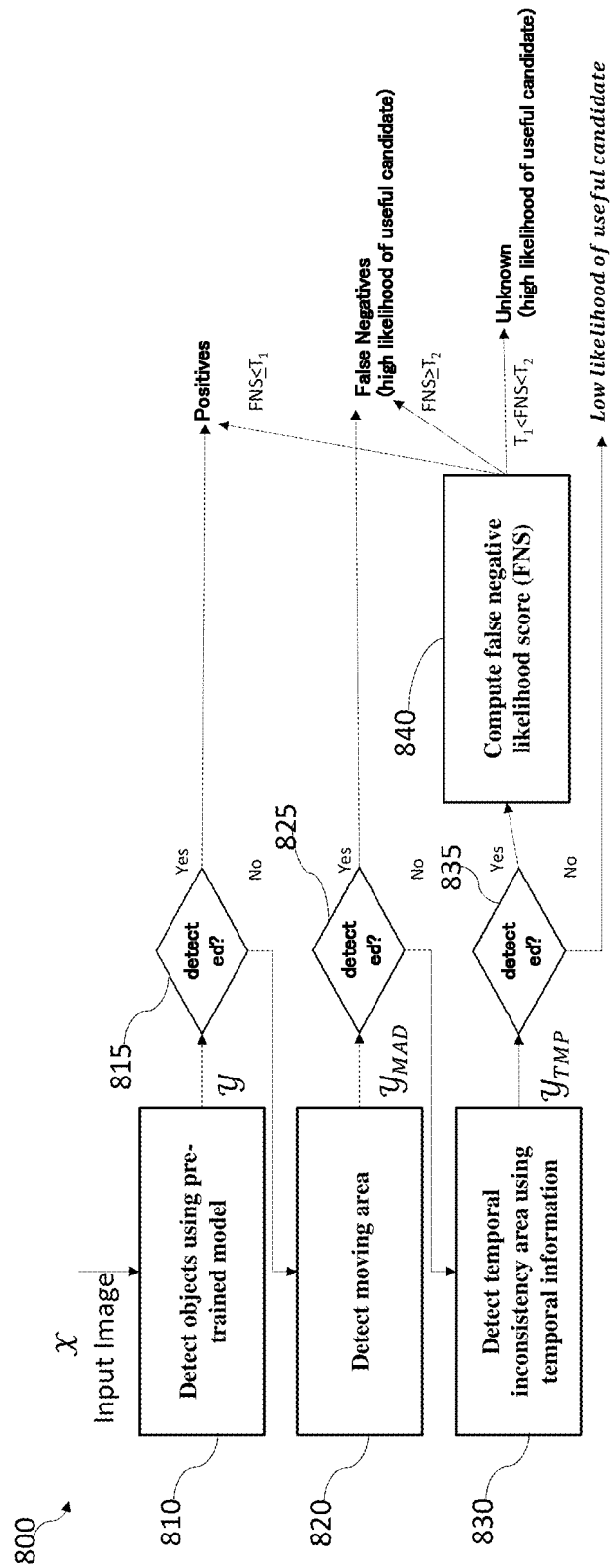
FIG. 8 is a flow chart of a method of identifying error candidates in accordance with some embodiments.

FIG. 8 is a flow chart of a method 800 of identifying error candidates in accordance with some embodiments. Method 800 includes operations 810, 815, 820, 825, 830 and 835, which are similar to operations 710, 715, 720, 725, 730 and 735, respectively, of method 700 and details of these operations are omitted for the sake of brevity.

In comparison with method 700, method 800 includes operation 840. In method 800, if a determination is made that temporal inconsistencies exist in operation 835, a false negative likelihood score (FNS) is computed in operation 840. The FNS is related to the severity of the temporal inconsistency. As the severity of the temporal inconsistency increases a likelihood of error also increases. Severity means a magnitude of deviation from an expected information within the temporal information detection image $\mathcal{Y}_{TMP}$.

Operation 840 utilizes temporal information detection images $\mathcal{Y}_{TMP}$ over a duration. In some embodiments, the duration is a predetermined duration. In some embodiments, the duration is adjusted based on a severity of the temporal inconsistencies of temporal information detection images $\mathcal{Y}_{TMP}$. Operation 840 compares information in the temporal information detection images $\mathcal{Y}_{TMP}$ to determine differences between values, such as noise or light level, at different locations within in the temporal information detection images $\mathcal{Y}_{TMP}$ in order to compute the FNS. The differences are determined by calculating vectors of pixel values in temporal information detection images $\mathcal{Y}_{TMP}$ through the duration.

FNS values range from 0.0 to 1.0. An FNS value of 0.0 indicates no or minimal temporal inconsistencies. An FNS value of 1.0 indicates at least one significant temporal inconsistency. A magnitude of a temporal inconsistency is a factor in the FNS value. A temporal inconsistency where a location transitions from bright to black indicates a high probability of an object within the image. In contrast, a minor change in light level is less likely to indicate the presence of an object in the image. A length of time that the temporal inconsistency exists is also a factor in the FNS value. A brief temporal inconsistency is more likely to be attributed to a defect in the image capturing device because an object is unlikely to be able to enter and exit the location monitored by the image capturing device within a very short time period. In contrast, a prolonged temporal inconsistency is more likely to indicate the presence of an object or at least potentially indicate that a defect in the image captured device obscured a potential object. For example, if a change in noise (or light level) is very minor or brief across the duration of temporal information detection images $\mathcal{Y}_{TMP}$ operation 840 returns a FNS value of 0.0. In contrast, if a change in noise (or light level) is drastic or prolonged across the temporal information detection images $\mathcal{Y}_{TMP}$ in the duration operation 840 returns a FNS value of 1.0, for example. As the time period of the temporal inconsistency or the magnitude of the change in the temporal information detection images $\mathcal{Y}_{TMP}$ changes operation 840 will return intermediate FNS values between 0.0 and 1.0.

Based on the FNS value, method 800 determines whether the temporal inconsistency is considered to be an error candidate. If the FNS value is less than or equal to a first threshold $T_1$ the temporal information detection images $\mathcal{Y}_{TMP}$ is considered not to include potential objects and no error candidate is identified. If the FNS value is greater than or equal to a second threshold $T_2$ the temporal information detection images $\mathcal{Y}_{TMP}$ is considered to include a potential object and an error candidate is identified. If the FNS value is between the first threshold $T_1$ and the second threshold $T_2$, the temporal information detection images $\mathcal{Y}_{TMP}$ is considered to have a high likelihood of a potential object and an error candidate is identified. In some embodiments, the first threshold $T_1$ is 0.0. A first threshold $T_1$ of 0.0 helps to minimize a risk of missing potential objects that were undetected by the pre-trained model. In some embodiments, the second threshold $T_2$ ranges from 0.5 to 0.8. If the second threshold $T_2$ is too high, then a risk of missing potential objects undetected by the pre-trained model increases. In some embodiments, unless the FNS value is less than or equal to the first threshold $T_1$, the temporal information detection images $\mathcal{Y}_{TMP}$ is considered to include a potential object and an error candidate is identified.

Error candidates identified at either operation 825 or having an FNS value above the first threshold are reported to the user for review. By providing error candidates to the user only when there is a high likelihood of error in the initial detection by the pre-trained model, method 800 reduces a workload of the user by providing the user only with images that have an increased likelihood of containing an error for review. The advantages for this reduced workload are discussed above.

Figure 9:
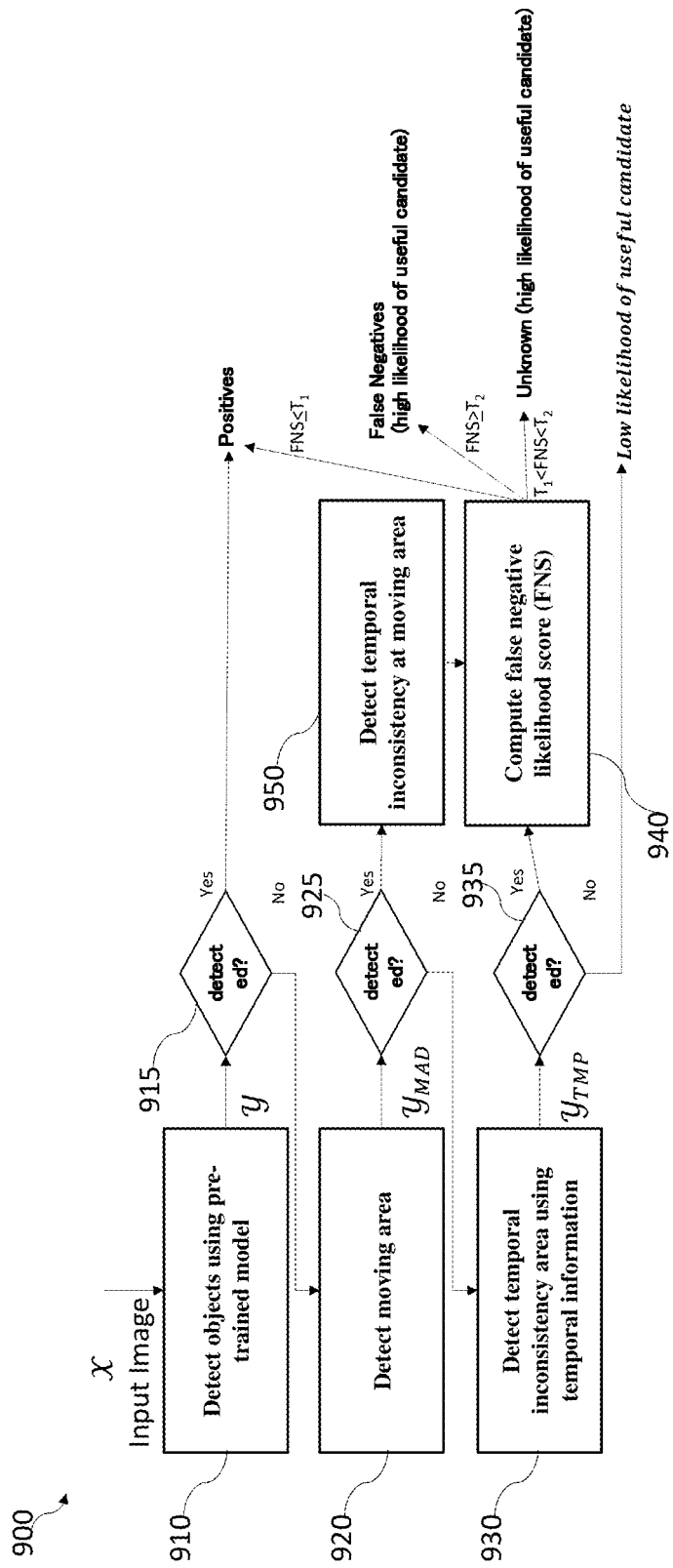
FIG. 9 is a flow chart of a method of identifying error candidates in accordance with some embodiments.

FIG. 9 is a flow chart of a method 900 of identifying error candidates in accordance with some embodiments. Method 900 includes operations 910, 915, 920, 925, 930, 935 and 940, which are similar to operations 810, 815, 820, 825, 830, 835 and 840, respectively, of method 800 and details of these operations are omitted for the sake of brevity.

In comparison with method 800, method 900 includes operation 950. In method 800, if a determination is made that moving areas are detected in operation 925, temporal information detection is performed on detected moving areas in the moving area detection image $\mathcal{Y}_{MAD}$. Temporal information detection in operation 950 is similar to operation 730, described above, except that the analysis is performed on detected moving areas.

Figure 10:
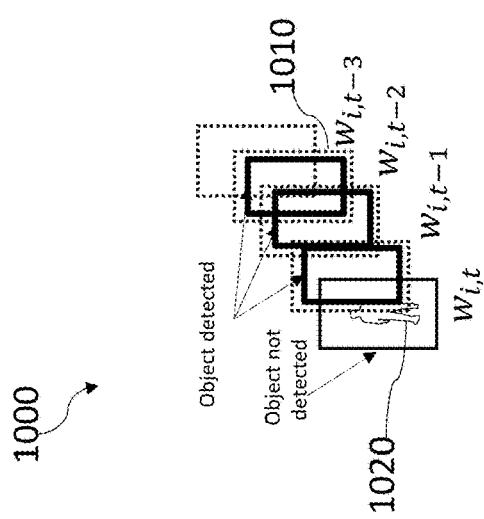
FIG. 10 is a view of a plurality of search windows and an object in accordance with some embodiments.

FIG. 10 is a view 1000 of a plurality of search windows 1010 and an object 1020 in accordance with some embodiments. The plurality of search windows 1010 in FIG. 10 are search windows in images captured at different times. The location of each of the plurality of search windows 1010 in FIG. 10 is the same within the respective captured images. An object is detected within the search window at times t−3, t−2 and t−1. However, no object is detected within the search window at time t. Based on the consistent detection of the object at three previously captured images, there is a high level of expectation that the object will also be present in the search window at time t. The failure to detect the object 1020 in the search window at time t is a temporal inconsistency. By performing temporal consistency analysis on the moving area detection image $\mathcal{Y}_{MAD}$, method 900 is able to help to improve feedback to the model used for analyzing input images.

Figure 11:
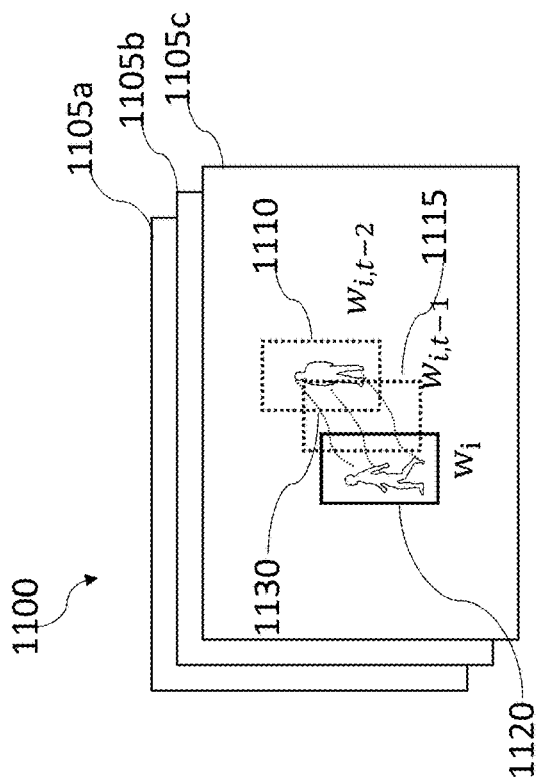
FIG. 11 is a view of a plurality of images and an object in accordance with some embodiments.

FIG. 11 is a view 1100 of a plurality of images 1105a-1105c and an object in accordance with some embodiments. The plurality of search images 1105a-1105c are sequential input images captured at different times. An object moves from a first position in image 1105a to a second position in image 1105c. Search window 1110 corresponds to a search window in image 1105a. Search window 1115 corresponds to a search window in image 1105b. Search window 1120 corresponds to a search window in image 1105c. For the sake of clarity, search windows 1110, 1115 and 1120 are shown together to assist in understanding of detecting of potential error candidates. An object is detected within the search window 1110 at time t−2 and in the search window 1120 at time t. However, no object is detected within the search window 1115 at time t−1. Based on the consistent detection of the object at a time before and after time t−1, there is a high level of expectation that the object should be present in the search window 1115 at time t−1. The failure to detect the object in the search window 1115 at time t−1 is a temporal inconsistency.

A location of search window 1115 within image 1105b is determined based on the change in a first position of the object detected in search window 1110 and a second position the object detected in search window 1120. Predicted path lines 1130 indicate a predicted path of movement from the first position to the second position. Using these predicted path lines 1130 an expected position for the object in image 1105b is determined. Using predicated path lines 1130 helps to reduce an amount of computation for identifying error candidates and temporal inconsistencies. By performing temporal consistency analysis on the moving area detection image $\mathcal{Y}_{MAD}$, method 900 is able to help to improve feedback to the model used for analyzing input images.

Returning to method 900, following operation 950 method 900 proceeds to operation 940. In comparison with method 800, identification of error candidates is based on FNS values from operation 940 and the determination of a detected moving area at operation 925 does not necessarily result in the identification of an error candidate.

Error candidates having an FNS value above the first threshold are reported to the user for review. By providing error candidates to the user only when there is a high likelihood of error in the initial detection by the pre-trained model, method 900 reduces a workload of the user by providing the user only with images that have an increased likelihood of containing an error for review. The advantages for this reduced workload are discussed above.

Figure 12:
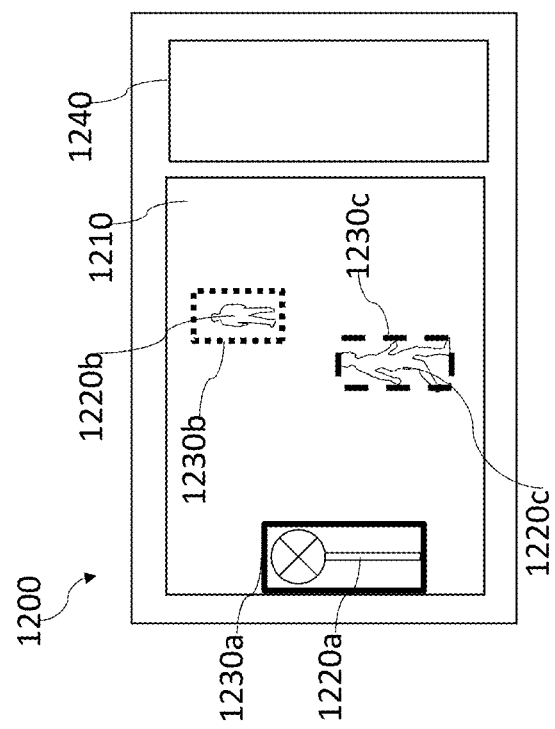
FIG. 12 is a view of a user interface including an image including identified objects and identified candidate objects in accordance with some embodiments.

FIG. 12 is a view of a user interface (UI) 1200 including an image 1210 including an identified object 1220a and identified candidate objects 1220b and 1220c in accordance with some embodiments. UI 1200 includes an image 1210 and an input field 1240.

Image 1210 corresponds to an input image $\mathcal{X}$ captured by an image capturing device. Image 1210 includes a detected object 1220a surrounded by a solid line label 1230a. Detected object 1220a was detected by the pre-trained model, e.g., in operation 322 or operation 710. The fact that detected objection 1220a was detected by the pre-trained model is made clear to the user by the solid line label 1230a.

Image 1210 further includes a moving area detected object 1220b surrounded by a dotted line label 1230b. Moving area detected object 1220b was identified, e.g., in operation 324 or operation 720, as an error candidate corresponding to a potential object in input image $\mathcal{X}$ that was not detected by the pre-trained model. The fact that moving area detected object 1220b was detected as an error candidate by a moving area analysis is made clear to the user by the dotted line label 1230b. The use of a dotted line label 1230b instead of a solid line label helps the user determine that user action is requested to confirm or decline the potential object identified by the moving area detection.

Image 1210 further includes a temporal inconsistency detected object 1220c surrounded by a dashed line label 1230c. Temporal inconsistency detected object 1220c was identified, e.g., in operation 326 or operation 730, as an error candidate corresponding to a potential object in input image $\mathcal{X}$ that was not detected by the pre-trained model. In some embodiments, temporal inconsistency detected object 1220c was also not identified by the moving area analysis. The fact that temporal inconsistency detected object 1220c was detected as an error candidate by a temporal inconsistency analysis is made clear to the user by the dashed line label 1230c. The use of a dashed line label 1230c instead of a solid line label helps the user determine that user action is requested to confirm or decline the potential object identified by the moving area detection.

Clearly indicating error candidates for soliciting user input for confirmation of an undetected object is the purpose of having a label different from the objects detected by the pre-trained model. In some embodiments, all error candidates have a same type of label, e.g., a dotted line. In some embodiments, the error candidates are identified in image 1210 using color, highlight, text boxes or other suitable identifying information.

Input field 1240 permits the user to input information to be associated with image 1210. In some embodiments, the information includes a type of object detected, a type of error candidate, light conditions of the image 1210, position of a detected object, position of an error candidate, or other suitable information.

A user is able to use UI 1200 to confirm whether object 1220*b* or object 1220*c* is an actual object within image 1210. This information is then fed back into the pre-trained model in order to improve the algorithms used to identified objects in captured images. In some embodiments, the UI 1200 includes a touch screen and the user is able to use the touch screen to confirm whether object 1220*b* or object 1220*c* is an actual object. In some embodiments, the user uses a cursor, such as a mouse, to confirm whether object 1220*b* or object 1220*c* is an actual object.

FIG. 13 is a view of a user interface (UI) 1300 including an image 1310 including an identified object 1320*a* and identified candidate objects 1320*b* and 1320*c* in accordance with some embodiments. UI 1300 includes an image 1310 and a first input field 1340 and a second input field 1350. Image 1310 is similar to image 1210 and a detailed description of this element is omitted for the sake of brevity. First input field 1340 is similar to input field 1240 and a detailed description of this element is omitted for the sake of brevity.

In comparison with UI 1200, UI 1300 includes second input field 1350. Second input field 1350 includes a field 1352 for receiving information related to a type of object for an error candidate or detected object. In FIG. 13, the field 1352 is partially filled in with a type of "Person." Other types of categories of object include signs, similar to object 1320*a*, vehicles, roadways, buildings, or other suitable categories.

Second input field 1350 further includes field 1354 for receiving a location of the error candidate or detected object. The location of the error candidate or detected object is based on a position of a label, e.g., dotted line label 1330*b*, in the image 1310. In some embodiments, the location of the error candidate or detected object is automatically by a system used to analyze the input image $\mathcal{X}$. In some embodiments, the location of the error candidate or detected object is based on an input from the user. In some embodiments, the input from the user is received through a touch screen. In some embodiments, the input from the user is received through the use of a cursor. In some embodiments, the input from the user is received through typing of information. In some embodiments, a location is automatically determined by the system and then adjusted based on user input. For example, in image 1310 they system determined the location of dotted line label 1330*b'*; however, the user modified the location of the object to establish the dotted line label 1330*b*. Dotted line label 1330*b* being smaller than dotted line label 1330*b'* helps to provide more accurate feedback to the pre-trained model to improve precision of future image analysis.

Second input field 1350 includes a field 1356 for confirming whether an error candidate is an object that should be detected during analysis of the image. The user is able to select "Yes" to indicate that error candidate is an object or select "No" to indicate that the error candidate is not an object. In some embodiments, the input from the user is received through a touch screen. In some embodiments, the input from the user is received through the use of a cursor. In some embodiments, the input from the user is received through typing of information.

Figure 14:
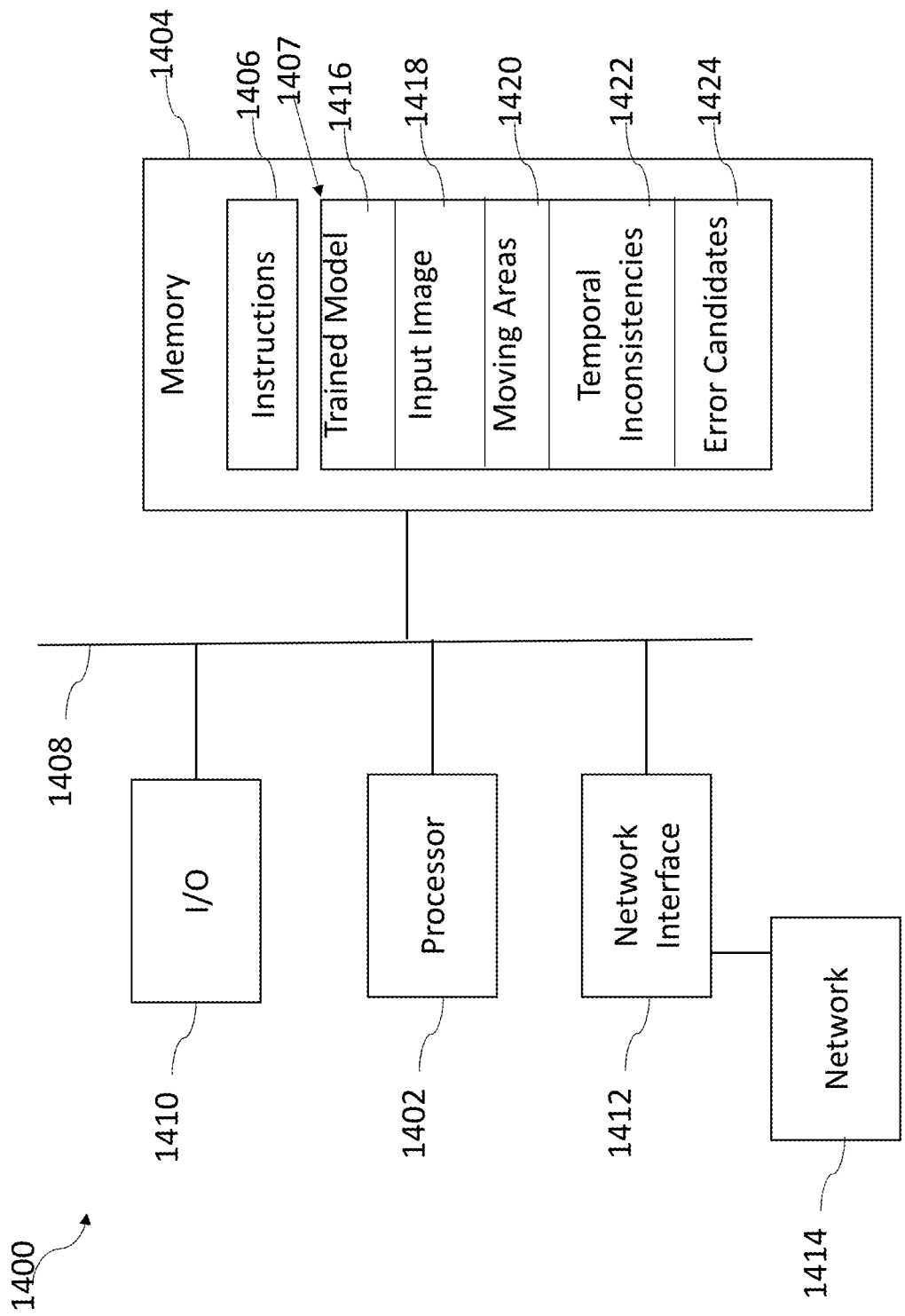
FIG. 14 is a block diagram of a system for implementing identification of error candidates in accordance with some embodiments.

FIG. 14 is a block diagram of a system 1400 for implementing identification of error candidates in accordance with some embodiments. System 500 includes a hardware processor 1402 and a non-transitory, computer readable storage medium 1404 encoded with, i.e., storing, the computer program code 1406, i.e., a set of executable instructions. Computer readable storage medium 1404 is also encoded with parameters 1407 for implementing the instructions and interfacing with external devices, such as image capturing devices, servers, etc. The processor 1402 is electrically coupled to the computer readable storage medium 1404 via a bus 1408. The processor 1402 is also electrically coupled to an I/O interface 1410 by bus 1408. A network interface 1412 is also electrically connected to the processor 1402 via bus 1408. Network interface 1412 is connected to a network 1414, so that processor 1402 and computer readable storage medium 1404 are capable of connecting to external elements via network 1414. The processor 1402 is configured to execute the computer program code 1406 encoded in the computer readable storage medium 1404 in order to cause system 1400 to be usable for performing a portion or all of the operations as described for system 300 or system 600 or in method 700, method 800 or method 900.

In some embodiments, the processor 1402 is a central processing unit (CPU), a multi-processor, a distributed processing system, an application specific integrated circuit (ASIC), and/or a suitable processing unit.

In some embodiments, the computer readable storage medium 1404 is an electronic, magnetic, optical, electromagnetic, infrared, and/or a semiconductor system (or apparatus or device). For example, the computer readable storage medium 1404 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 1404 includes a compact disk-read only memory (CD-ROM), a compact disk-read/write (CD-R/W), and/or a digital video disc (DVD).

In some embodiments, the storage medium 1404 stores the computer program code 1406 configured to cause system 1400 to perform operations as described for system 300 or system 600 or in method 700, method 800 or method 900. In some embodiments, the storage medium 1404 also stores information needed for performing operations as described for system 300 or system 600 or in method 700, method 800 or method 900 as well as information generated during performing the method 700, method 800 or method 900, such as a trained model parameter 1416, an input image parameter 1418, a moving areas parameter 1420, a temporal inconsistencies parameter 1422, an error candidate parameter 1424 and/or a set of executable instructions to perform the operation as described for system 300 or system 600 or in method 700, method 800 or method 900.

In some embodiments, the storage medium 1404 stores instructions 1407 for interfacing with external machines and implementing operations as described for system 300 or system 600 or in method 700, method 800 or method 900. The instructions 1407 enable processor 1402 to generate instructions readable by the external machines to effectively implement operations as described for system 300 or system 600 or in method 700, method 800 or method 900.

System 1400 includes I/O interface 1410. I/O interface 1410 is coupled to external circuitry. In some embodiments, I/O interface 1410 includes a keyboard, keypad, mouse, trackball, trackpad, and/or cursor direction keys for communicating information and commands to processor 1402.

System 1400 also includes network interface 1412 coupled to the processor 1402. Network interface 1412 allows system 1400 to communicate with network 1414, to which one or more other computer systems are connected. Network interface 1412 includes wireless network interfaces such as BLUETOOTH, WIFI, WIMAX, GPRS, or WCDMA; or wired network interface such as ETHERNET, USB, or IEEE-1394. In some embodiments, method 700, method 800 or method 900 is implemented in two or more systems 1400, and information is exchanged between different systems 1400 via network 1414.

System 1400 is configured to receive information related to a trained model through I/O interface 1410 or network interface 1412. The information is transferred to processor 1402 via bus 1408. The trained model is then stored in computer readable medium 1404 as trained model parameter 1416. System 1400 is also configured to update the trained model parameter 1416 based on feedback related to error candidates confirmed to be objects. System 1400 is configured to receive information related to an input image through I/O interface 1410 or network interface 1412. The information is stored in computer readable medium 1404 as input image parameter 1418. System 1400 is configured to receive information related to moving areas through I/O interface 1410 or network interface 1412. The information is stored in computer readable medium 1404 as moving areas parameter 1420. System 1400 is configured to receive information related to temporal inconsistencies through I/O interface 1410 or network interface 1412. The information is stored in computer readable medium 1404 as temporal inconsistencies parameter 1422. System 1400 is configured to receive information related to error candidates through I/O interface 1410 or network interface 1412. The information is stored in computer readable medium 1404 as error candidates parameter 1424. In some embodiments, the information related to trained model parameter 1416, input image parameter 1418, moving areas parameter 1420, temporal inconsistencies parameter 1422 or error candidates parameter 1424 is generated or updated by processor 1402 and written to computer readable medium 1404.

(Supplemental Note 1)

A method of training a model includes generating processed data, wherein generating the processed data includes analyzing an input related to image using a pre-trained model to detect an object in the input. The method further includes generating moving area detection data, wherein generating the moving area detection data includes analyzing the input to determine whether any areas within the input exhibit movement. The method further includes generating temporal inconsistency data, wherein generating the temporal inconsistency data includes analyzing the processed data to determine whether any areas within the processed data exhibit a temporal inconsistency. The method further includes identifying whether the input contains an error candidate based on the moving area detection data and the temporal inconsistency data. The method further includes receiving confirmation information regarding whether the error candidate is an undetected object within the input. The method further includes updating the pre-trained model in response to receiving the confirmation information indicating that the error candidate is the undetected object within the input.

(Supplemental Note 2)

In some embodiments, generating the moving area detection data includes analyzing both the input and the processed data.

(Supplemental Note 3)

In some embodiments, identifying whether the input contains the error candidate includes identifying whether the input contains the error candidate based on the processed data.

(Supplemental Note 4)

In some embodiments, identifying whether the input contains the error candidate includes identifying whether the input includes the error candidate based on inverse processed data, and the inverse processed data corresponds the processed data excluding the object detected during generating the processed data.

(Supplemental Note 5)

In some embodiments, the method further includes determining a false negative likelihood score (FNS) based on the temporal inconsistency data.

(Supplemental Note 6)

In some embodiments, wherein identifying whether the input contains the error candidate includes identifying whether the input contains the error candidate based on a value of the FNS.

(Supplemental Note 7)

In some embodiments, wherein identifying whether the input contains the error candidate includes identifying whether the input as containing the error candidate based on a value of the FNS exceeding a threshold.

(Supplemental Note 8)

In some embodiments, wherein determining the FNS includes determining the FNS based on the moving area detection data.

(Supplemental Note 9)

In some embodiments, the method further includes displaying the object, the error candidate, a first label and a second label, wherein the first label associated with the object is different from the second label associated with the error candidate.

(Supplemental Note 10)

In some embodiments, the method further includes receiving instructions for adjusting a size or location of the second label; and updating the pre-trained model based on the adjusted size or location of the second label.

(Supplemental Note 11)

A system for training a model includes an image receiver; a display; a memory configured to store instructions thereon; and a processor connected to the image receiver, the display and the memory. The processor is configured to execute the instructions for generating processed data, wherein generating the processed data includes analyzing an input related to image using a pre-trained model to detect an object in the input. The processor is further configured to execute the instructions for generating moving area detection data, wherein generating the moving area detection data includes analyzing the input to determine whether any areas within the input exhibit movement. The processor is further configured to execute the instructions for generating temporal inconsistency data, wherein generating the temporal inconsistency data includes analyzing the processed data to determine whether any areas within the processed data exhibit a temporal inconsistency. The processor is further configured to execute the instructions for identifying whether the input contains an error candidate based on the moving area detection data and the temporal inconsistency data. The processor is further configured to execute the instructions for receiving confirmation information regarding whether the error candidate is an undetected object within the input. The processor is further configured to execute the instructions for updating the pre-trained model in response to receiving the confirmation information indicating that the error candidate is the undetected object within the input.

(Supplemental Note 12)

In some embodiments, the processor is configured to execute the instructions for generating the moving area detection data by analyzing both the input and the processed data.

(Supplemental Note 13)

In some embodiments, the processor is configured to execute the instructions for identifying whether the input contains the error candidate by identifying whether the input contains the error candidate based on the processed data.

(Supplemental Note 14)

In some embodiments, the processor is configured to execute the instructions for identifying whether the input contains the error candidate by identifying whether the input includes the error candidate based on inverse processed data, and the inverse processed data corresponds the processed data excluding the object detected during generating the processed data.

(Supplemental Note 15)

In some embodiments, the processor is configured to execute the instructions for determining a false negative likelihood score (FNS) based on the temporal inconsistency data.

(Supplemental Note 16)

In some embodiments, the processor is configured to execute the instructions for identifying whether the input contains the error candidate based on a value of the FNS.

(Supplemental Note 17)

In some embodiments, the processor is configured to execute the instructions for determining the FNS based on the moving area detection data.

(Supplemental Note 18)

In some embodiments, the processor is configured to execute the instructions for instructing the display to display the object, the error candidate, a first label and a second label, and the first label associated with the object is different from the second label associated with the error candidate.

(Supplemental Note 19)

In some embodiments, the processor is configured to execute the instructions for receiving instructions for adjusting a size or location of the second label; and updating the pre-trained model based on the adjusted size or location of the second label.

(Supplemental Note 20)

A non-transitory computer readable medium storing instructions, which when executed by a processor cause the processor to generate processed data, wherein generating the processed data comprises analyzing an input related to an image using a pre-trained model to detect an object in the input; generate moving area detection data, wherein generating the moving area detection data comprises analyzing the input to determine whether any areas within the input exhibit movement; generate temporal inconsistency data, wherein generating the temporal inconsistency data comprises analyzing the processed data to determine whether any areas within the processed data exhibit a temporal inconsistency; identify whether the input contains an error candidate based on the moving area detection data and the temporal inconsistency data; receive confirmation information regarding whether the error candidate is an undetected object within the input; and update the pre-trained model in response to receiving the confirmation information indicating that the error candidate is the undetected object within the input.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of training a model, the method comprising:
generating processed data, wherein generating the processed data comprises analyzing an input related to an image using a pre-trained model to detect an object in the input;
generating moving area detection data, wherein generating the moving area detection data comprises analyzing the input to determine whether any areas within the input exhibit movement;
generating temporal inconsistency data, wherein generating the temporal inconsistency data comprises analyzing the processed data to determine whether any areas within the processed data exhibit a temporal inconsistency;
identifying whether the input contains an error candidate based on the moving area detection data and the temporal inconsistency data;
receiving confirmation information regarding whether the error candidate is an undetected object within the input; and
updating the pre-trained model in response to receiving the confirmation information indicating that the error candidate is the undetected object within the input.

2. The method according to claim 1, wherein generating the moving area detection data comprises analyzing both the input and the processed data.

3. The method according to claim 1, wherein identifying whether the input contains the error candidate comprises identifying whether the input contains the error candidate based on the processed data.

4. The method according to claim 1, wherein identifying whether the input contains the error candidate comprises identifying whether the input includes the error candidate based on inverse processed data, and the inverse processed data corresponds the processed data excluding the object detected during generating the processed data.

5. The method according to claim 1, further comprising determining a false negative likelihood score (FNS) based on the temporal inconsistency data.

6. The method according to claim 5, wherein identifying whether the input contains the error candidate comprises identifying whether the input contains the error candidate based on a value of the FNS.

7. The method according to claim 5, wherein identifying whether the input contains the error candidate comprises identifying whether the input as containing the error candidate based on a value of the FNS exceeding a threshold.

8. The method according to claim 5, wherein determining the FNS comprises determining the FNS based on the moving area detection data.

9. The method according to claim 1, further comprising displaying the object, the error candidate, a first label and a second label, wherein the first label associated with the object is different from the second label associated with the error candidate.

10. The method according to claim 9, further comprising:
receiving instructions for adjusting a size or location of the second label; and
updating the pre-trained model based on the adjusted size or location of the second label.

11. A system for training a model, the system comprising:
an image receiver;
a display;
a memory configured to store instructions thereon; and
a processor connected to the image receiver, the display and the memory, wherein the processor is configured to execute the instructions for:
generating processed data, wherein generating the processed data comprises analyzing an input related to an image using a pre-trained model to detect an object in the input;
generating moving area detection data, wherein generating the moving area detection data comprises analyzing the input to determine whether any areas within the input exhibit movement;
generating temporal inconsistency data, wherein generating the temporal inconsistency data comprises analyzing the processed data to determine whether any areas within the processed data exhibit a temporal inconsistency;
identifying whether the input contains an error candidate based on the moving area detection data and the temporal inconsistency data;
receiving confirmation information regarding whether the error candidate is an undetected object within the input; and
updating the pre-trained model in response to receiving the confirmation information indicating that the error candidate is the undetected object within the input.

12. The system according to claim 11, wherein the processor is configured to execute the instructions for generating the moving area detection data by analyzing both the input and the processed data.

13. The system according to claim 11, wherein the processor is configured to execute the instructions for identifying whether the input contains the error candidate by identifying whether the input contains the error candidate based on the processed data.

14. The system according to claim 11, wherein the processor is configured to execute the instructions for identifying whether the input contains the error candidate by identifying whether the input includes the error candidate based on inverse processed data, and the inverse processed data corresponds the processed data excluding the object detected during generating the processed data.

15. The system according to claim 11, wherein the processor is configured to execute the instructions for determining a false negative likelihood score (FNS) based on the temporal inconsistency data.

16. The system according to claim 15, wherein the processor is configured to execute the instructions for identifying whether the input contains the error candidate based on a value of the FNS.

17. The system according to claim 15, wherein the processor is configured to execute the instructions for determining the FNS based on the moving area detection data.

18. The system according to claim 11, wherein the processor is configured to execute the instructions for instructing the display to display the object, the error candidate, a first label and a second label, and the first label associated with the object is different from the second label associated with the error candidate.

19. The system according to claim 18, wherein the processor is configured to execute the instructions for:
receiving instructions for adjusting a size or location of the second label; and
updating the pre-trained model based on the adjusted size or location of the second label.

20. A non-transitory computer readable medium storing instructions, which when executed by a processor cause the processor to:
generate processed data, wherein generating the processed data comprises analyzing an input related to an image using a pre-trained model to detect an object in the input image;
generate moving area detection data, wherein generating the moving area detection data comprises analyzing the input to determine whether any areas within the input exhibit movement;
generate temporal inconsistency data, wherein generating the temporal inconsistency data comprises analyzing the processed data to determine whether any areas within the processed data exhibit a temporal inconsistency;
identify whether the input contains an error candidate based on the moving area detection data and the temporal inconsistency data;
receive confirmation information regarding whether the error candidate is an undetected object within the input; and
update the pre-trained model in response to receiving the confirmation information indicating that the error candidate is the undetected object within the input.

* * * * *